(12) United States Patent
Takano et al.

(10) Patent No.: US 6,269,219 B1
(45) Date of Patent: Jul. 31, 2001

(54) RECORDING FOUR CHANNELS OF DIGITAL AUDIO DATA ON TWO CHANNELS OF A MAGNETIC TAPE

(75) Inventors: Akira Takano; Shigeru Akahane, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/995,804

(22) Filed: Dec. 22, 1997

(30) Foreign Application Priority Data

Dec. 26, 1996 (JP) .............................................. P08-348782

(51) Int. Cl.$^7$ ...................................................... H04N 5/92
(52) U.S. Cl. ................................ 386/54; 360/13; 360/15; 386/52
(58) Field of Search .................................. 386/4, 52, 45, 386/54, 64, 96, 125, 126; 360/13, 15; 369/83; H04N 5/76, 5/92, 9/79

(56) References Cited

U.S. PATENT DOCUMENTS

| | | | |
|---|---|---|---|
| 5,208,678 | * 5/1993 | Nakagawa | 386/104 |
| 5,638,224 | * 6/1997 | Nakatani | 360/15 |
| 5,642,459 | * 6/1997 | Arano et al. | 386/96 |
| 6,097,676 | * 8/2000 | Fujinami | 386/126 |

* cited by examiner

Primary Examiner—Thai Tran
(74) Attorney, Agent, or Firm—Frommer Lawrence & Haug, LLP.; William S. Frommer (57) ABSTRACT

A data transfer and recording apparatus capable of transferring data recorded on a hard disk to a magnetic tape of a VTR apparatus and recording the same there, wherein four channels of audio data reproduced from the hard disk are recorded on the magnetic tape by recording two channels of the audio data A1(1) and A2(1) on a two-channel audio sector of the magnetic tape, then recording two channels of the audio data A3(1) and A4(1) via a flap portion. At this time, the video data V(1) is repeatedly recorded via the flap portion.

10 Claims, 11 Drawing Sheets

CONFIGURATION OF EDITING APPARATUS

FIG. 1

CONFIGURATION OF EDITING APPARATUS

FIG. 2

FIG. 3
CONFIGURATION OF DISK CONTROL UNIT

FIG. 4

CONFIGURATION OF SDDI INTERFACE UNIT

AUDIO DATA OF UNDERLYING STOCK

FIG. 10B

AUDIO DATA OF SPLICED STOCK

FIG. 10C

CROSS-FADE DATA

FIG. 11A

AUDIO DATA OF UNDERLYING STOCK

FADE-OUT/FADE-IN PROCESSING

FIG. 11B

AUDIO DATA OF SPLICED STOCK

FIG. 11C

FADE-IN/FADE-OUT DATA

RECORDING FOUR CHANNELS OF DIGITAL AUDIO DATA ON TWO CHANNELS OF A MAGNETIC TAPE

BACKGROUND OF THE INVENTION

1. Field of the Invention

The present invention relates to a data transfer and recording apparatus capable of transferring data recorded on for example a hard disk to a magnetic tape by using a VTR apparatus and recording the same on the magnetic tape and to a method of the same.

2. Description of the Related Art

In recent years, editing systems using video data recorded on hard disks or the like for editing have been developed.

In such editing systems, the video data is transferred to a hard disk from an inexpensive VTR tape or the like and the editing work carried out while nonlinearly (randomly) accessing the hard disk.

In such an editing system, when the user desires to edit the video data being edited on another editing system or when desiring to realize a back-up function, it is necessary to specially add a streamer of other dedicated machine, it is suffered by a rise of price.

SUMMARY OF THE INVENTION

An object of the present invention is to provide a data transfer and recording apparatus capable of transferring data recorded on for example a hard disk to a magnetic tape of a VTR apparatus and recording the same there at a low cost and a method of the same.

To attain the above object, according to a first aspect of the present invention, there is provided a data transfer and recording apparatus for transferring four channels of digital audio data from a disk-shaped recording medium to a magnetic tape provided with a two-channel audio sector and recording them on the same, comprising a recording controlling means for dividing the four channels of audio data of a certain stock reproduced from the disk-shaped recording medium into two sets each comprising two channels, recording one set of audio data in a first region of the audio sector, and recording the other set of audio data in a second region continuing from the first region.

In the data transfer and recording apparatus of the present invention, the four channels of audio data recorded on a hard disk or other disk-shaped recording medium are divided into two sets each comprising two channels and then recorded on the audio sector of the magnetic tape since a magnetic tape is provided with only a two-channel audio sector and cannot record four channels of audio data if the form is left as it is.

The video data, on the other hand, may be repeatedly recorded on regions of the video sector corresponding to the first region and second region of the audio sector so as to facilitate establishment of correspondence with the audio data and make management easier.

Alternatively, it is possible to record video data on a region of the video sector corresponding to the first region of the audio sector and to record video data of a next stock on a region of the video sector corresponding to the second region of the audio sector so as to improve the efficiency of recording of the magnetic tape.

According to a second aspect of the present invention, there is provided a data transferring and recording method for transferring four channels of digital audio data from a disk-shaped recording medium to a magnetic tape provided with a two-channel audio sector and recording the same, comprising the steps of dividing four channels of audio data of stock reproduced from the disk-shaped recording medium into two sets each comprising two channels; and recording one set of audio data in a first region of the audio sector and recording the other set of audio data in a second region continuing from the first region.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Below, an explanation will be made of an editing apparatus as an embodiment of a data transfer and recording apparatus according to the present invention.

Figure 1:
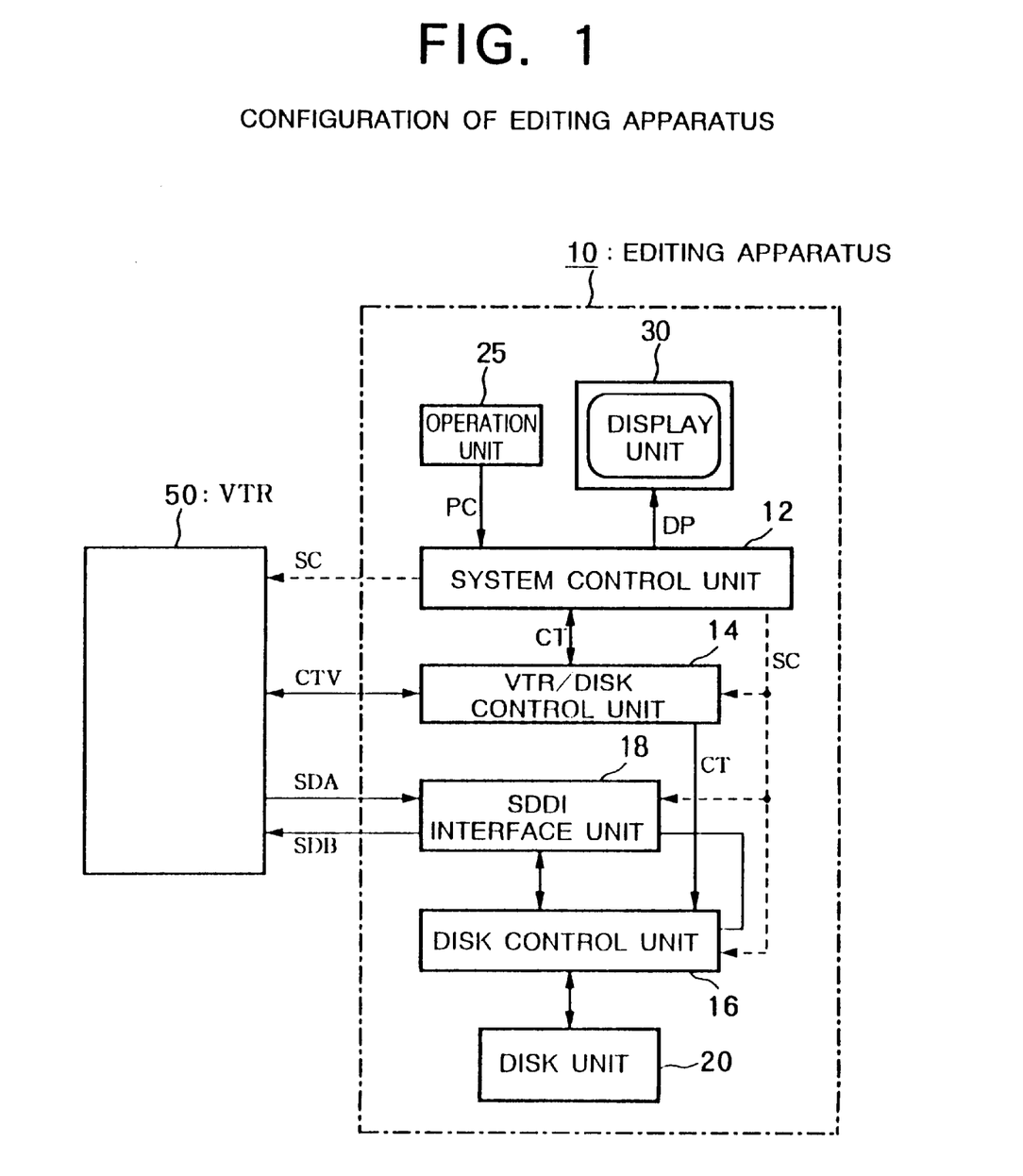
FIG. 1 is a view of the configuration of an editing apparatus according to an embodiment of the present invention.

FIG. 1 is a view of the configuration of an editing apparatus 10 of the present embodiment.

A detailed explanation will be first made of the configuration of the editing apparatus of the present embodiment by using FIG. 1. In FIG. 1, the editing apparatus 10 has connected to it a video tape recorder (hereinafter referred to as a "VTR") 50 for playing back a magnetic tape on which stock to be edited is recorded or splicing new stock on the magnetic tape on which the stock is recorded.

The editing apparatus 10 is constituted by a system control unit 12, a VTR/DISK control unit 14, a disk control unit 16, an SDDI interface unit 18, a disk nit 20, an operation unit 25, and a display unit 30.

In the system control unit 12 of the editing apparatus 10, a synchronization signal SC is generated. This synchronization signal SC is supplied to the VTR/DISK control unit 14, the disk control unit 16, and the SDDI interface unit 18 to enable the operations to be carried out in synchronization. The synchronization signal SC is also supplied to the VTR 50 to enable the operation of the VTR 50 to be carried out in synchronization with the editing apparatus 10.

In this editing apparatus 10, the user operates the operation unit 25 whereby an operation signal PC in accordance with the input command is supplied to the system control unit 12. At the same time, a control signal CT is generated based on the operation signal PC in the system control unit 12 so as to control the operations of the editing apparatus 10 and the VTR 50. Further, a display signal DP is supplied from the system control unit 12 to the display unit 30 to display the operation state etc. of the editing apparatus 10 and the VTR 50 on the display unit 30.

The VTR/DISK control unit 14 receives as its input the control signal CT from the system control unit 12 and converts this control signal CT to a 9-pin command to generate an operation signal CTV. It controls the VTR 50 by this operation signal CTV. Further, the VTR/DISK control unit 14 makes the disk control unit 16 to perform synchronization processing by the control signal CT. Further, the SDDI interface unit 18 controls the audio data output to the SDDI based on the control signal from the disk control unit 16. Further, the SDDI interface unit 18 receives as its input the audio data from the disk unit 20 via the disk control unit 16 and records this audio data on the VTR 50 via the SDDI cable by the frame size.

Next, an explanation will be made of the configuration of the VTR/DISK control unit 14.

Figure 2:
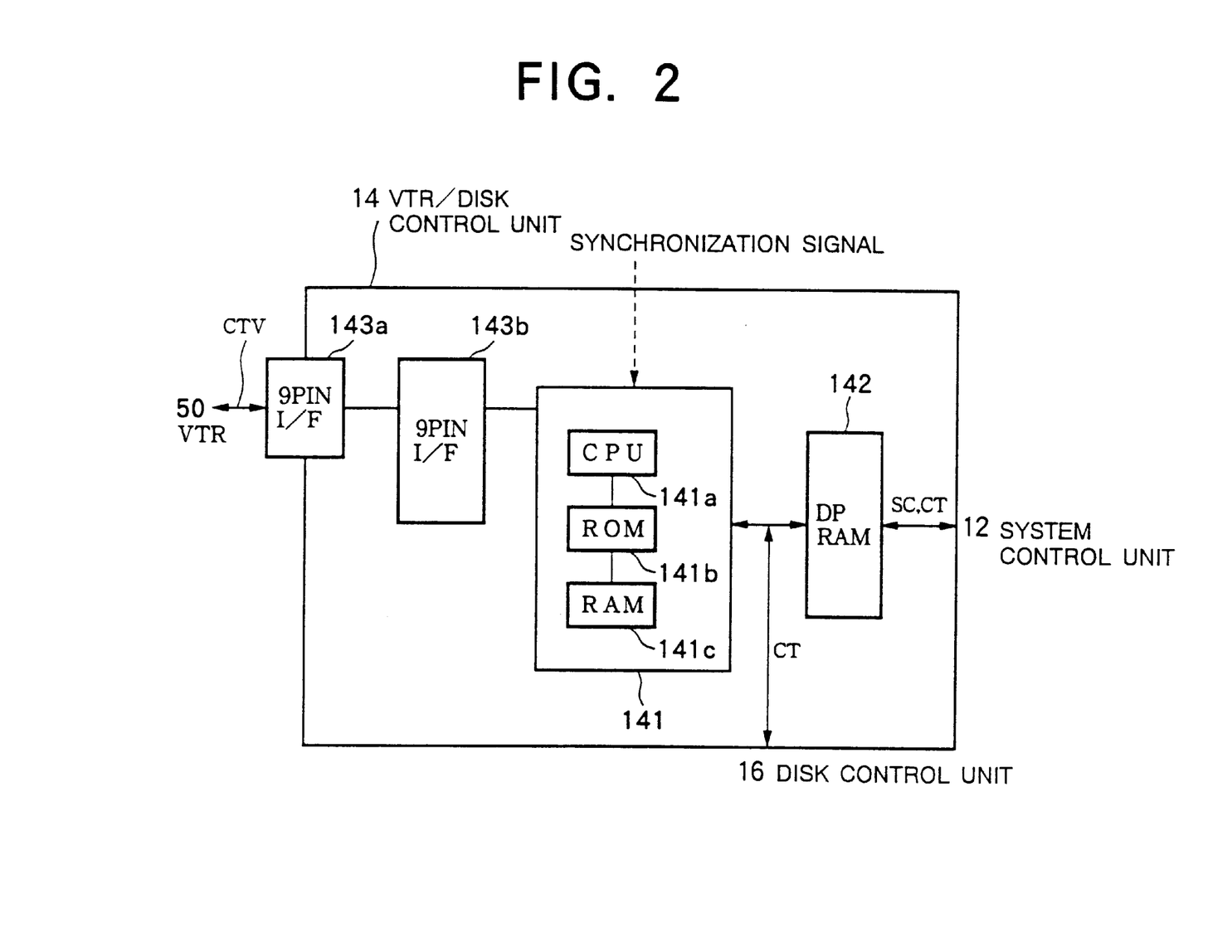
FIG. 2 is a view of the configuration of a VTR/DISK control unit shown in FIG. 1.

FIG. 2 is a view of the configuration of the VTR/DISK control unit 14.

As shown in FIG. 2, the synchronization signal SC from the system control unit 12 is supplied to a VTR control CPU block 141. Further, the control signal CT supplied from the system control unit 12 is supplied to the VTR control CPU block 141 via a dual port RAM 142 and, at the same time, supplied to the disk control unit 16 mentioned later. The VTR control CPU block 141 is constituted by a central processing unit (hereinafter referred to as a "CPU") 141*a*, a ROM 141*b*, and a RAM 141*c*. The control signal CTV for controlling the VTR 50 is generated based on the control signal CT. This generated control signal CTV is synchronized with the synchronization signal SC and supplied to the VTR 50 via interfaces 143*a* and 143*b* of for example an RS-422 standard.

The VTR control CPU block 141 shown in FIG. 2 digitally records the digital data from the present position to the magnetic tape by the format shown in FIGS. 8A to 8C and FIGS. 9A to 9C mentioned later when receiving as input a recording command or assemble command from the system control unit 12 shown in FIG. 1.

Next, an explanation will be made of the disk control unit 16.

Figure 3:
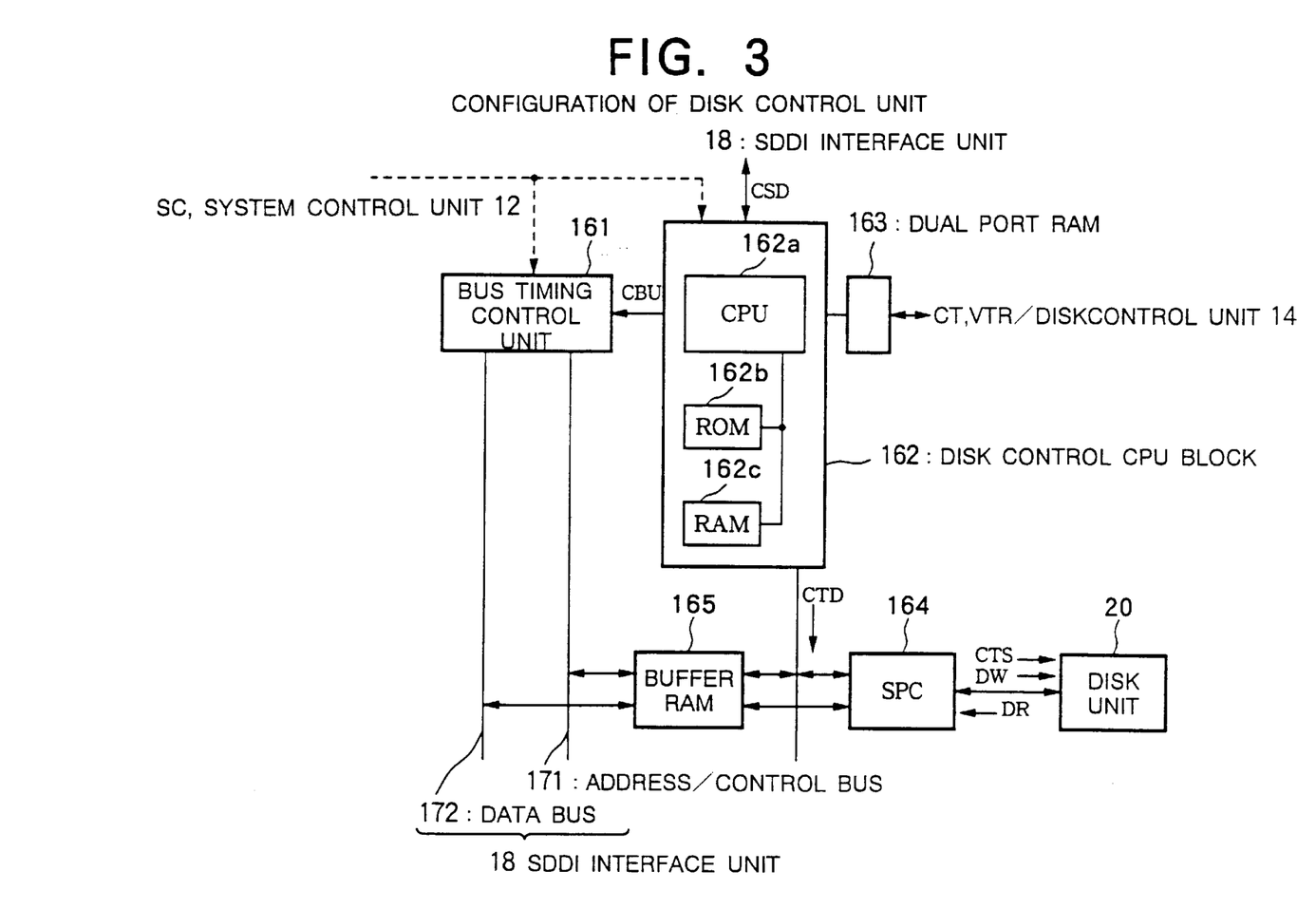
FIG. 3 is a view of the configuration of a disk control unit shown in FIG. 1.

FIG. 3 is a view of the configuration of the disk control unit 16.

As shown in FIG. 3, the disk control unit 16 has a bus timing control unit 161, a disk control CPU block 162, a dual port RAM 163, an SPC 164, and a buffer RAM 165.

As shown in FIG. 3, the synchronization signal SC is supplied to the bus timing control unit 161 and the disk control CPU block 162. The control signal CT from the VTR/DISK control unit 14 is supplied to the disk control CPU block 162 via the dual port RAM 163. The disk control CPU block 162 is constituted by a CPU 162*a*, a ROM 162*b*, and a RAM 162*c*. A control signal CTD for controlling the disk unit 20 is generated based on the control signal CT and supplied to an SCSI (small computer system interface) protocol controller (hereinafter referred to as an "SPC") 164. At the SPC 164, based on the control signal CTD from the disk control CPU block 162, a control signal CTS of the SCSI standard is generated and supplied to the disk unit 20.

Further, at the disk control CPU block 162, a bus timing control signal CBU is generated and supplied to the bus timing control unit 161. This bus timing control unit 161 has connected to it an address/control bus 171 and a data bus 172. The transfer of signals via the address/control bus 171 and the data bus 172 is controlled by the bus timing control unit 161.

These address/control bus 171 and the data bus 172 are connected to the buffer RAM 165. Further, the buffer RAM 165 is connected to the SPC 164. Data signals transferred between the data bus 172 and the SPC 164 are temporarily held in the buffer RAM 165. At the same time, data signals used in the cross-fade processing or fade-out/fade-in processing mentioned later are generated in the disk control CPU block 162 by using the held data signals. More specifically, the disk control CPU block 162 transfers the audio data from the disk unit 20 from the SPC 164 to the buffer RAM 165, processes this audio data, and then re-writes it in the disk unit 20 from the buffer RAM 165. At this time, as the processing of the audio data, cross-fade processing or fade-out/fade-in processing for suppressing for example the generation of noise is carried out. On the other hand, since video data is divided into units of frames in advance, the problem of generation of noise does not occur. A detailed explanation will be given later of these cross-fade processing and fade-out/fade-in processing.

In the data recording means, that is, the disk unit 20, the data signal DW supplied via the buffer RAM 165 and the SPC 164 is recorded based on the control signal CTS or the data signal DR read from the disk unit 20 is transferred to the data bus 172 via the SPC 164 and the buffer RAM 165.

Note that the disk control CPU block 162 also generates the control signal CSD for controlling the SDDI interface unit 18.

Next, an explanation will be given of the configuration of the SDDI interface unit 18.

Figure 4:
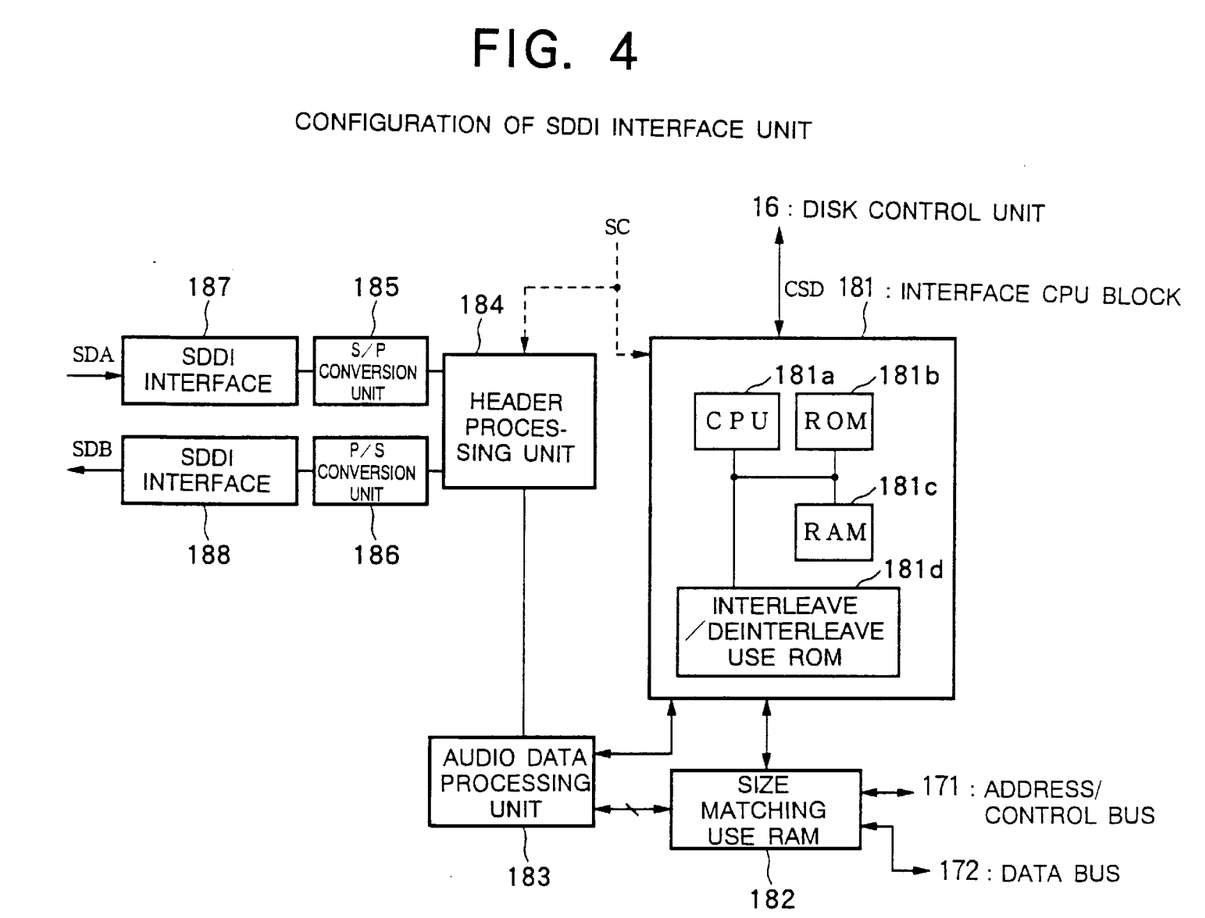
FIG. 4 is a view of the configuration of an SDDI interface unit shown in FIG. 1.

FIG. 4 is a view of the configuration of the SDDI interface unit 18.

The control signal CSD supplied from the disk control unit 16 is supplied to the interface CPU block 181. Further, the synchronization signal SC supplied from the system control unit 12 is supplied to an interface CPU block 181 and a header processing unit 184. Note that the interface CPU block 181 is constituted by a CPU 181*a*, a RON 181*b*, a RAM 181*c*, and an interleave/deinterleave use ROM 181*d*.

The address/control bus 171 connected to the bus timing control unit 161 of the disk control unit 16 and the data bus 172 have connected to them a size matching use RAM 182. This size matching use RAM 182 has connected to it an audio data processing unit 183 and an interface CPU block 181. The audio data processing unit 183 has connected to it a header processing unit 184, while the header processing unit 184 has connected to it an S/P (serial-to-parallel) conversion unit 185 and a P/S (parallel-to-serial) conversion unit 186. The S/P conversion unit 185 is connected to the VTR 50 via the SDDI interface 187, while the P/S conversion unit 186 is connected to the VTR 50 via the SDDI interface 188.

Figure 5A:
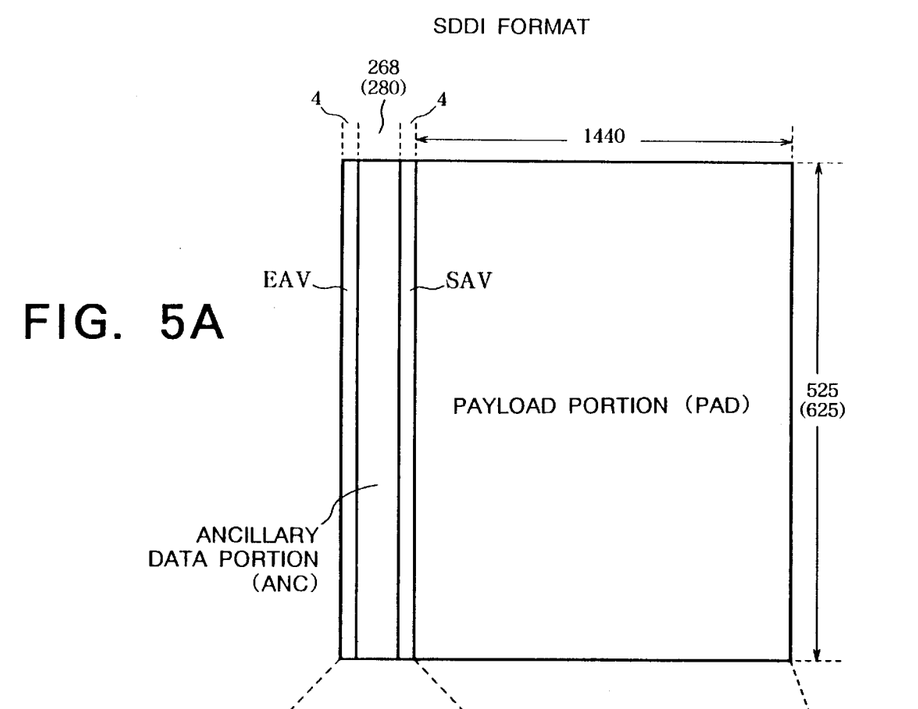
FIGS. 5A to 5C are views for explaining the SDDI format.
Figure 5B:
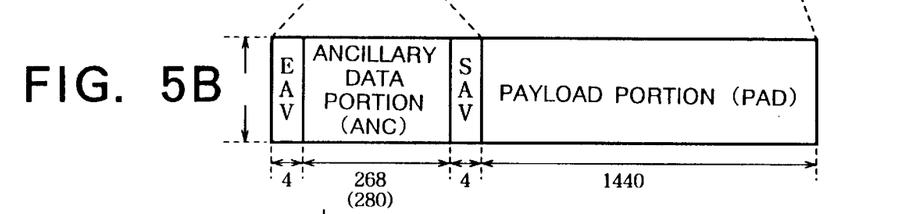
Figure 5C:
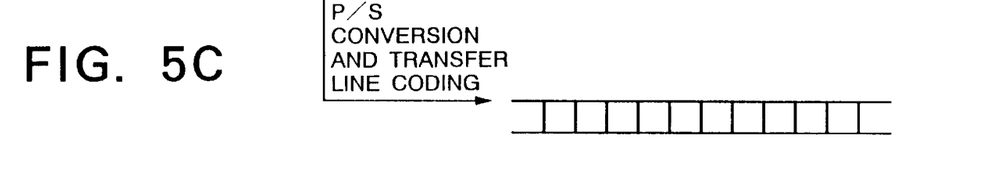

Here, an explanation will be made of the SDDI (serial digital data interface) format used in the SDDI interfaces 187 and 188 by using FIGS. 5A to 5C. FIG. 5A shows an overall configuration of the SDDI format; while FIG. 5B shows the configuration of a transfer use packet of the SDDI format.

In the case of a video signal of the 525/60 system, video data of the SDDI format is comprised by (4+268+4+1440)=1716 words per line in the horizontal direction and 525 lines in the vertical direction. Note that, in FIGS. 5A and 5B, the parenthesized numbers denote the numerical values of video data of the 625/50 system (PAL system). A digital video signal of the SDDI format is comprised by (4+280+4+1440) 1728 words per line in the horizontal direction and 625 lines in the vertical direction. Here, one word is comprised by 10 bits.

For each line, the four words from the first word to the fourth word are used as a region for storing a code EAV for indicating the end of a payload portion PAD explained later and separating the payload portion PAD and an ancillary data portion ANC explained later. The four-word code EAV is 3FFh (h is a code indicating a hexadecimal), 000h, 000h, or XYZh (XYZ is any data).

Further, for each line, the 268 words from a fifth word to a 272nd word are used as the ancillary data portion ANC characteristic of the SDDI format. A header, ancillary data, and the like explained later are stored here.

Further, for each line, the four words from a 273rd word to a 276th word are used as a region for storing a code SAV for indicating the start of the payload portion PAD and separating the payload portion PAD and the ancillary data portion ANC. The four-word code SAV is 3FFh. 000h, 000h, or XYZh (XYZ is any 10 data). The first three words are the same as those of the code EAV.

Further, for each line, the 1440 words from a 277th word to a 1716th word are used as the payload portion PAD. The video data and audio data are stored here.

The 10-bit parallel signals are converted from a parallel to serial format, encoded for the transfer line, and sent as serial data with a transfer rate of 270 Mbps.

In FIG. 4, when a signal SDA of the SDDI format is supplied from the VTR 50 to the S/P conversion unit 185 via the SDDI interface 187, the S/P conversion unit 185 converts the signal SDA of the serial data to parallel data and supplies it to the header processing unit 184. The header processing unit 184 separates the data indicating the header and other information of the ancillary data portion ANC from the parallel data from the S/P conversion unit 185. The video data and audio data of the payload portion PAD are supplied to the audio data processing unit 183. The audio data processing unit 183 separates the audio data from among the data of the payload portion PAD and, at the same time, performs deinterleave processing of the audio data based on the data of the interleave/ deinterleave use ROM 181d of the interface CPU block 181. The audio data subjected to this deinterleave processing is written into the size matching use RAM 182. Further, the audio data written in the size matching use RAN 182 is read out based on the signal from the address/control bus 171 and supplied to the disk control unit 16 via the data bus 172.

Further, when the audio data is supplied from the disk control unit 16, this audio data is written into the size matching use RAM 182. At the same time, based on the data of the interleave/deinterleave use ROM 181d of the interface CPU block 181, the reading of the data written in the size matching use RAM 182 is controlled and interleave processing carried out. At this time, the CPU 181a detects the frame period with a synchronization signal SC (frame pulse) as a reference and performs a predetermined amount of interleave processing with respect to the data input in the frame period after the previous frame.

The interleaved audio data is supplied to the audio data processing unit 183, mixed with the video data, and supplied to the header processing unit 184. The header processing unit 184 adds the header information etc. to the video data and the audio data and supplies them as parallel signals of the SDDI format to the P/S conversion unit 186. The P/S conversion unit 186 converts the parallel data to serial data and supplied it as the signal SDB via the SDDI interface 188 to the VTR 50.

Next, an explanation will be made of the configuration of the VTR 50.

Figure 6:
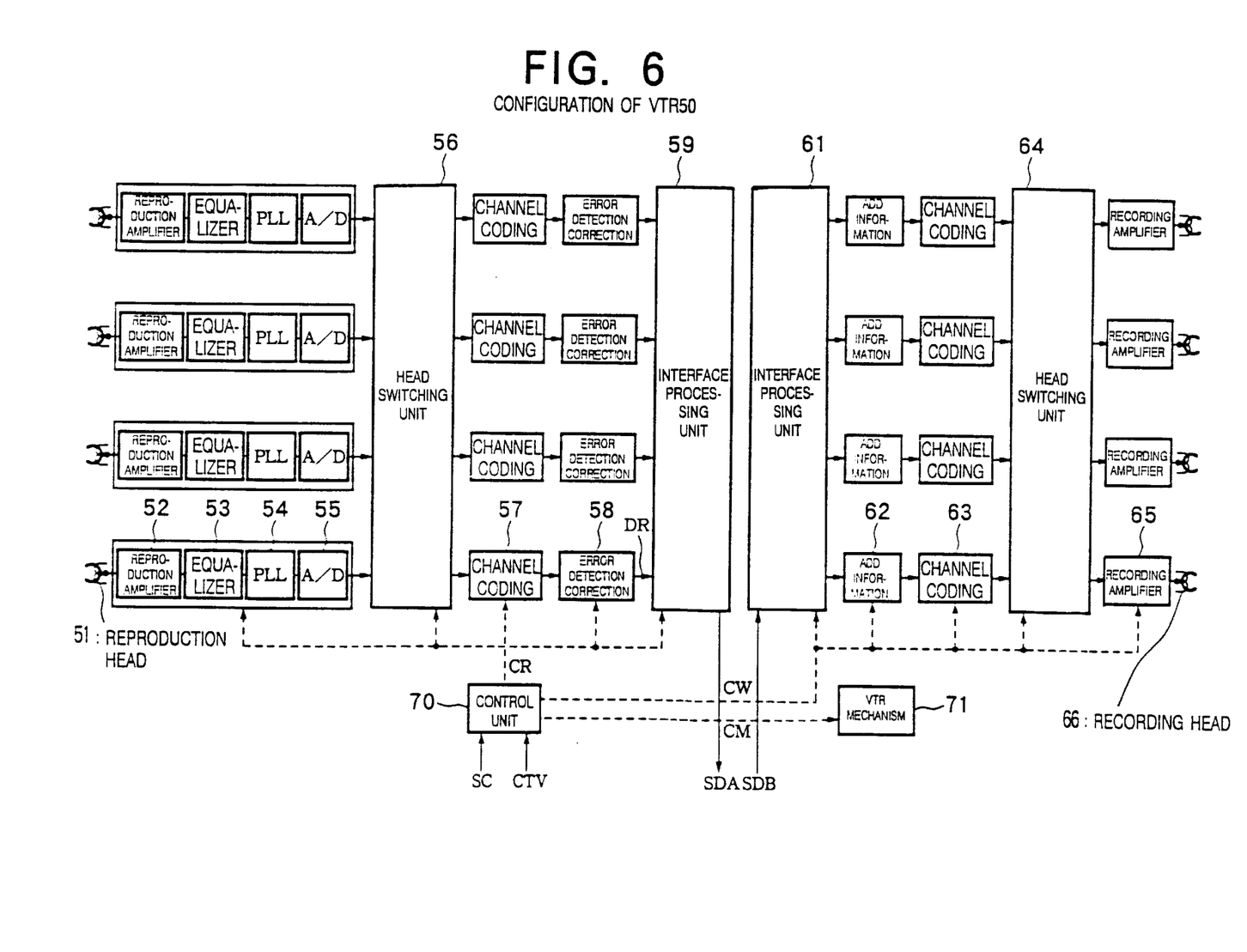
FIG. 6 is a view of the configuration of the VTR shown in FIG. 1.

FIG. 6 is a view of the configuration of the VTR 50.

Note that the VTR 50 has four systems of processing circuits and to designed so as to enable four-speed recording and reproduction by switching the signals of the four systems of processing circuits. Note that, in the following explanation, an explanation will be given of only one processing circuit.

Signals recorded on the magnetic tape are read out by the reproduction head 51, amplified by a reproduction amplifier 52, and supplied to an equalizer 53. At the equalizer 53, loss of the high frequency band is compensated. The signal compensated by this equalizer 53 is supplied to a PLL circuit 54. At the PLL circuit 54, a clock signal for signal extraction is generated. A signal extracted based on this clock signal is converted to a digital data signal at an A/D conversion unit 55 and supplied to a head switching unit 56. The head switching unit 56 is supplied with data signals from the other three systems of processing circuits. The head switching unit 56 has connected to it four systems of channel coding units. The data signals to be supplied to these channel coding units are switched based on a control signal CR from the control unit 70 mentioned later.

At the channel coding unit 57, a reproduction data signal is generated based on the data signal from the head switching unit 56. This reproduction data signal is subjected to error correction processing at an error correction unit 58 whereby it is corrected to a correct reproduction data signal DR and then is supplied to the SDDI processing unit 59.

The SDDI processing unit 59 is supplied with the other three systems of reproduction data signals. The header information etc. are added to these four systems of reproduction data signals which are then supplied to the editing apparatus 10 as serial data signals SDA.

The signal SDR supplied from the editing apparatus 10 to the VTR 50 is supplied to the SDDI interface processing unit 61, converted to parallel data, and separated into the different systems of video and audio data signals which are then supplied to different systems of error correction information addition units 62. Each error correction information addition unit 62 adds a parity for error correction to the supplied audio data. The data signal given this parity is supplied to the channel coding unit 63. The channel coding unit 63 converts the data signal to a recording signal by for example the scrambled interleaved NRZI system and supplies this to the head switching unit 64. The head switching unit 64 is supplied with the recording signals from the other three systems of processing circuits. The recording signal to be supplied to the four connected systems of recording amplifiers is switched based on a control signal CW from the control unit 70. The recording signal is supplied from this head switching unit 64 via the recording amplifier 65 to the recording head 66 whereby the data is recorded on the magnetic tape.

The control unit 70 is supplied with the control signal CTV and the synchronization signal SC from the editing apparatus 10 and generates the reproduction control signal CR or the recording control signal CW based on this control signal CTV. This reproduction control signal CR is supplied to the circuits for reproduction processing such as the head switching unit 56, the channel coding unit, and the error correction unit and the reproduction operation is carried out in synchronization with the operation of the editing apparatus 10. Further, the recording control signal CW is supplied to the circuits for recording processing such as the information addition unit, the channel coding unit, and the head switching unit 64 and the recording operation is carried out in synchronization with the operation of the editing apparatus 10. Note that the control unit 70 also generates a control signal CM for controlling the operation of the VTR mechanism 71.

Next, the format of a ¼ inch magnetic tape used in the VTR 50 will be explained.

Figure 7:
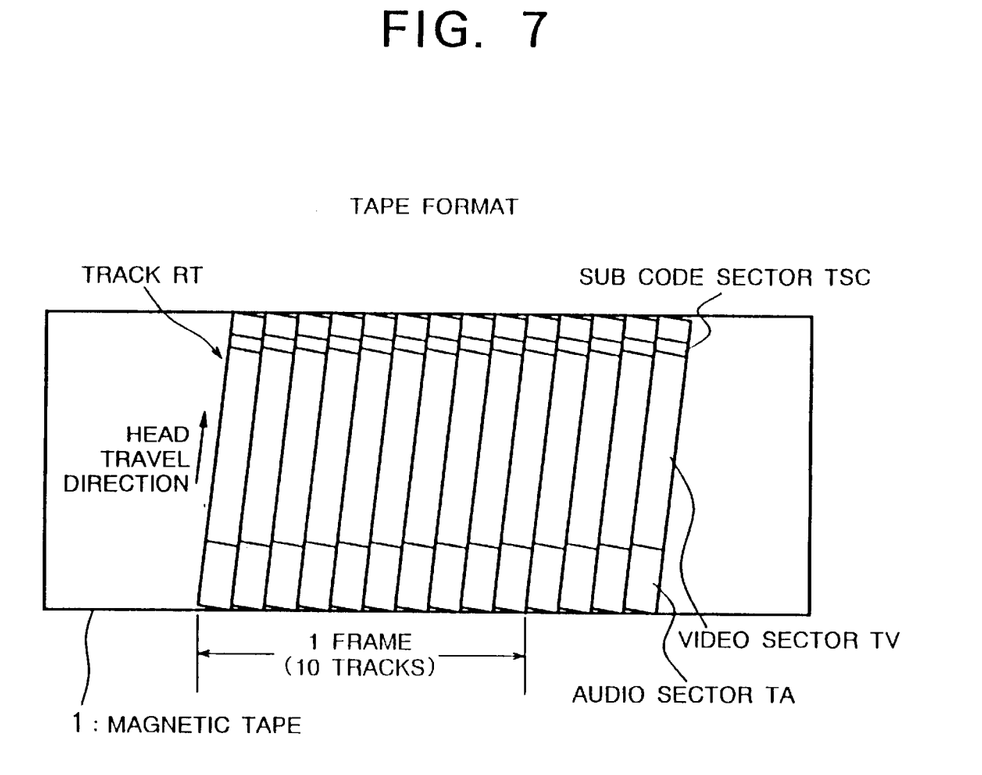
FIG. 7 is a view of the format of the magnetic tape.

FIG. 7 is a view for explaining the format of this magnetic tape.

In FIG. 7, an inclined track RT is produced by the rotary head at the center of the magnetic tape 1. This inclined track RT includes an audio sector TA on which the digital audio data is recorded, a video sector TV on which the video data is recorded, and a sub code sector TSC on which the sub code is recorded.

Figure 8A:
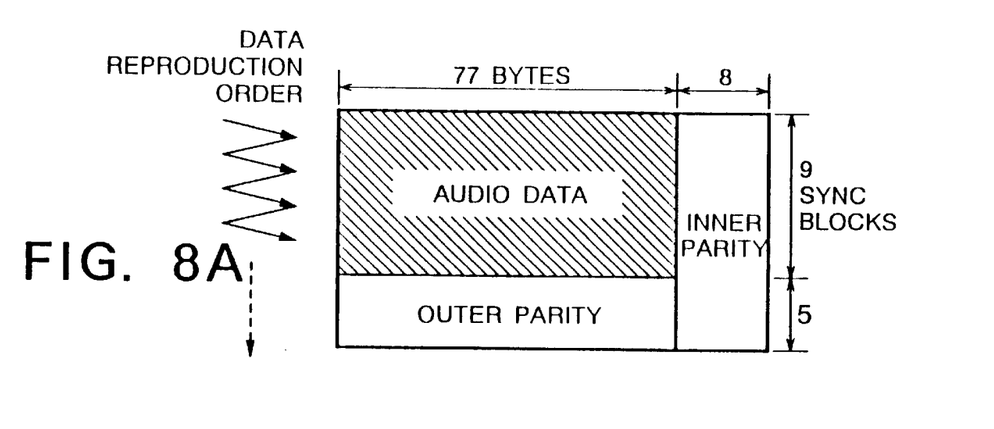
FIGS. 8A to 8C are views of the configurations of data recorded in an audio sector TA, a video sector TV, and a sub code sector TSC, respectively.
Figure 8B:
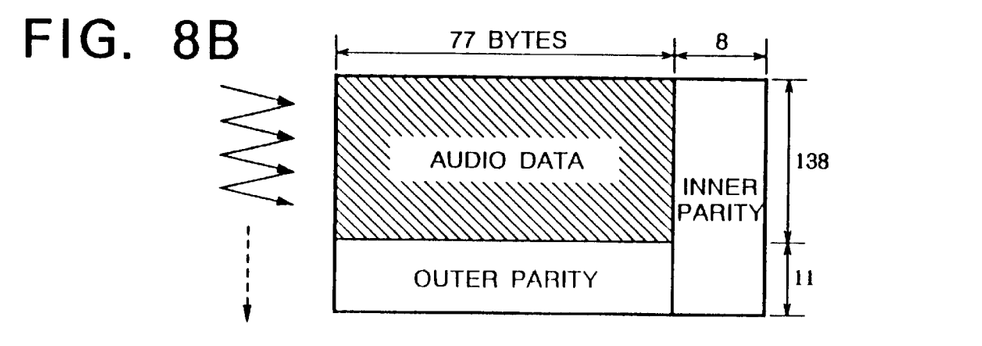
Figure 8C:
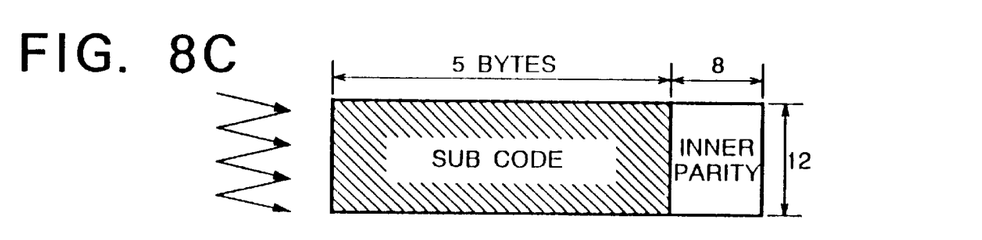

FIGS. 8A, 8B, and 8C show the configuration of the data recorded on the audio sector TA, the video sector TV, and the sub code sector TSC. The data is recorded divided into small units referred to sync blocks.

First, the data to be recorded on the audio sector TA is comprised of 14 sync blocks each given a sync block length of 85 (77+8) bytes as shown in FIG. 8A. Seventy-seven bytes of audio data are recorded in nine sync blocks among these sync blocks. Further, an outer parity of 77 bytes is recorded in five sync blocks. Further, an inner parity of eight bytes is recorded in 14 sync blocks.

Next, the data recorded on the video sector TV is comprised of 149 (138+11) sync blocks each given a sync block length of 85 (77+8) bytes as shown in FIG. 8B. Seventy-seven bytes of the video data are recorded in 138 sync blocks among these sync blocks. Further, an outer parity of 77 bytes is recorded in 11 sync blocks. Further, an inner parity of eight bytes is recorded in 149 sync blocks.

Next, as the data recorded in the sub code sector TSC, as shown in FIG. 8C, a sub code of 5 bytes and inner parity of 2 bytes are recorded in 12 sync blocks.

When the signal of one track is comprised in this way and the signal to be recorded on the magnetic tape is a signal of for example the 525/60 system (NTSC system), one frame of an image is formed by 10 inclined tracks RT of signals.

Further, channel CH1 of audio data of 48 kHz/16 bits is interleaved with the five tracks of the first half of a frame, while channel CH2 is interleaved with the five tracks of the latter half.

The processing in the VTR/DISK control unit 14 in FIG. 1 will be explained in further detail below.

Figure 9A:
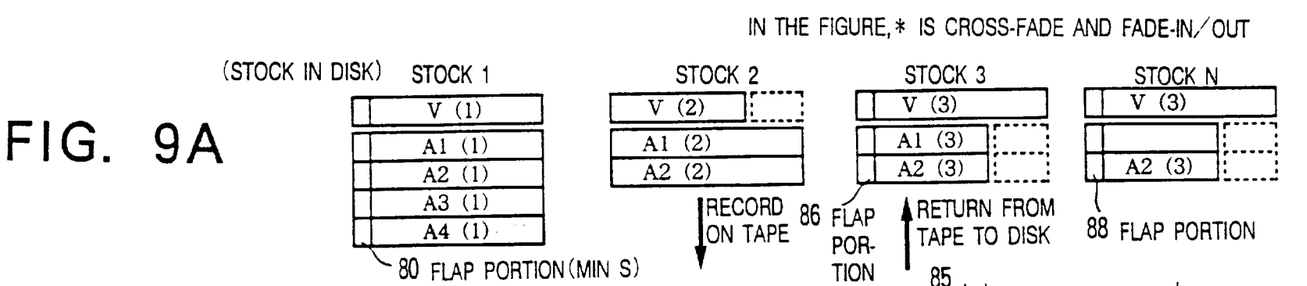
FIGS. 9A to 9C are views for explaining the processing in the VTR/DISK control unit in FIG. 1 in detail.
Figure 9B:
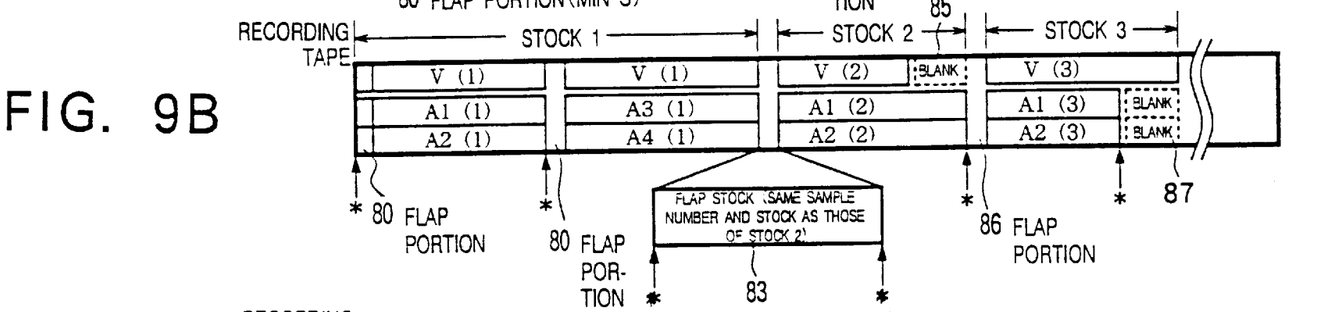
Figure 9C:
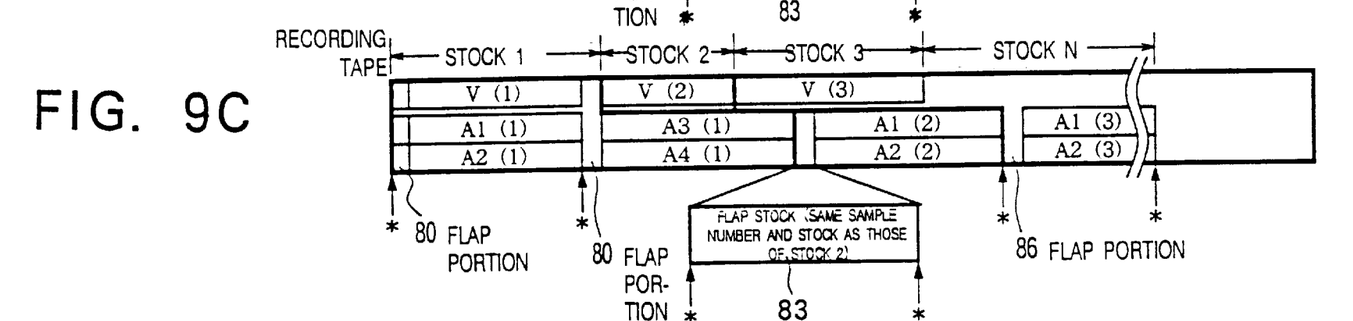

FIGS. 9A to 9C are views explaining the processing in the VTR/DISK control unit 14 in FIG. 1 in more detail.

FIG. 9A is a diagrammatical view of the content of stock recorded on the hard disk of the disk unit 20.

As shown in FIG. 9A, the hard disk of the disk unit 20 has successively recorded on it the "stock 1", "stock 2", "stock 3", . . . , and "stock N".

The "stock 1" is comprised of video data V(1) and audio data A1(1), A2(1), A3(1), and A4(1) of four channels (channels ch1, ch2, ch3, and ch4) of 48 kHz/16 bits having the same recording time. Further, a flap portion 80 added to the head.

Here, the flap portion 80 is used for informing the sampling frequency of the reproduction stock to the reproduction apparatus in advance preceding the reproduction of the reproduction stock in order to reproduce the audio data in a state where the reproduction apparatus correctly looks the PLL. Accordingly, the flap portion 80 is the stock data of the same sampling frequency as that of the reproduction stock following this.

The "stock 2" is comprised by video data V(2) and audio data A1(2) and A2(2) having a longer recording time than this video data V(2). The flap portion is not provided at the head of the "stock 2". This is the case where for example an editing point added in the editing processing is set at the head of the recording data or the case where it is set at a position where a flap portion of sufficient area is not provided.

The "stock 3" is comprised by video data V(3), audio data A1(3) and A2(3) of two channels having a shorter recording time than this video data V(3), and the head flap portion 88. The "stock N" has the same configuration as the "stock 3".

Below, an explanation will be made of the processing by the VTR/DISK control unit 14 when recording the recording data of the disk unit 20 shown in FIG. 9A on the magnetic tape of the VTR 50.

First, an explanation will be made of a case where the video data and audio data are recorded in correspondence with each other on the magnetic tape.

FIG. 9B is a view for explaining the state of recording of the magnetic tape when the video data and audio data are recorded in correspondence with each other.

In order to record the "stock 1" on the magnetic tape, the video data V(1) is repeatedly recorded on the video sector TV of the magnetic tape previously mentioned referring to FIG. 8. Further, the audio data A3(1) is recorded following the audio data A1(l) on the audio sector TA of channel 1 of the magnetic tape. Further, the audio data A4(1) is recorded following the audio data A2(1) on the audio sector TA of channel 2 of the magnetic tape.

Here, the flap portion 80 is recorded at the head of the first half of the video data V(1) and the audio data A1(1) and A2(1) and the head of the second half of the video data V(1) and the audio data A3(1) and A4(1).

Next, in order to record the "stock 2" on the magnetic tape, the video data V(2) is recorded on the video sector TV of the magnetic tape, the audio data A1(2) is recorded on the audio sector TA of channel 1, and the audio data A2(2) is recorded on the audio sector TA of channel 2.

Flap stock 83 of the same sampling frequency as that of the separately recorded "stock 2" is recorded between the recording region of the "stock 1" and the recording region of the "stock 2" on the magnetic tape. Here, it is also possible to use the "stock 2" as it is as the flap portion without using the separately recorded flap stock 83.

Further, the video data V(2) is shorter in recording time compared with the audio data A1(2) and A2(2), so a blank region 85 in which no data is recorded exists between the recording region of the video data V(2) and the flap portion 86.

Next, in order to record the "stock 3" on the magnetic tape, the video data V(3) is recorded on the video sector TV of the magnetic tape, the audio data A1(3) is recorded on the audio second TA of the channel 1, and the audio data A2(3) is recorded on the audio sector TA of the channel 2.

The flap portion 86 is recorded between the recording region of the "stock 2" and the recording region of the "stock 3" on the magnetic tape. Further, the video data V(2) has a longer recording time in comparison with the audio data A1(2) and A2(2), therefore a blank region 87 exists behind the audio data A1(2) and A2(2).

In the example shown in FIG. 9B, the video data and the audio data are recorded close to each in correspondence with each other, therefore the management of the stock becomes easy.

Next, an explanation will be made of a case where the video data and the audio data are recorded while being packed.

FIG. 9C is a view for explaining the state of recording of the magnetic tape when the video data and the audio data are recorded while being packed.

In order to record the "stock 1" on the magnetic tape, the video data V(1) is recorded on the video sector TV of the magnetic tape mentioned before by referring to FIG. 8, and the video data V(2) is recorded after this. Further, the audio data A3(1) is recorded after the audio data A1(1) on the audio sector TA of the channel 1 of the magnetic tape. Furthermore, the audio data A4(1) is recorded after the audio data A2(1) in the audio sector TA of the channel 2 of the magnetic tape.

Here, the flap portion 80 is recorded at the head of the first half of the video data V(1) and the audio data A(1) and A2(1) and the head of the second half of the video data V(2) and audio data A3(1) and A4(1).

Next, in order to record the "stock 3" on the magnetic tape, the video data V(3) is recorded after the video data V(2) on the video sector TV of the magnetic tape, the audio data A1(2) is recorded after the audio data A3(1) on the audio sector TA of the channel 1, and the audio data A2(2) is recorded after the audio data A4(1) on the audio sector TA of the channel 2.

Between the audio data A3(1) and A4(1) and the audio data A1(2) and A2(2) on the magnetic tape, the flap stock 83 having the same sampling frequency as that of the separately recorded "stock 2" is recorded. Here, it is also possible to use the "stock 2" as the flap portion as it is without using the separately recorded flap stock 83. On the other hand, the video data V(2) and the video data V(3) are recorded while being packed, so the flap portion is not recorded between them.

The audio data A1(3) and A2(3) are recorded behind the audio data A1(2) and A2(2) via the flap portion 86.

In this way, in the example shown in FIG. 9C, stocks from the disk unit 20 are recorded on the magnetic tape while being packed from the front, so the efficiency of usage of the magnetic tape can be improved.

The VTR/DISK control unit 14 performs processing for returning the data recorded on the magnetic tape of the VTR 50 from the hard disk of the disk unit 20 to the disk unit 20 again by restoring the data structure shown in FIG. 9A again using as a reference the time code in the sub code shown in FIG. 8C as mentioned above.

Next, the cross-fade processing and fade-out/fade-in processing performed in the disk control CPU block 162 of the disk control unit 16 shown in FIG. 3 will be explained in detail.

As mentioned before, the cross-fade processing and the fade-out/fade-in processing are carried out for audio data for suppressing the noise produced at the splice of the stocks.

These processings are carried out by using the audio data of the underlying stock written in the disk unit 20 and the audio data of the spliced stock already written in the disk unit 20.

First, an explanation will be made of the cross-fade processing.

Figure 10A:
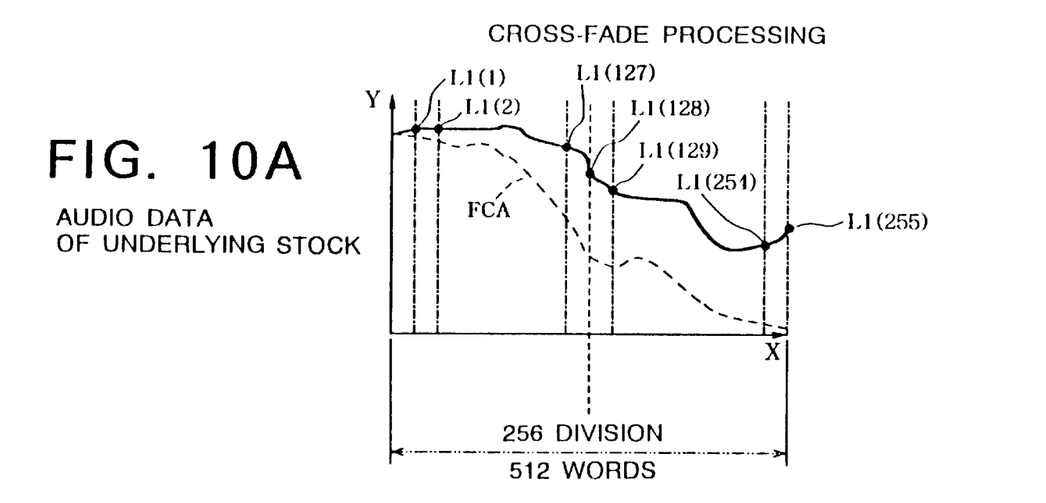
FIGS. 10A to 10C are views for explaining a cross-fade processing.
Figure 10B:
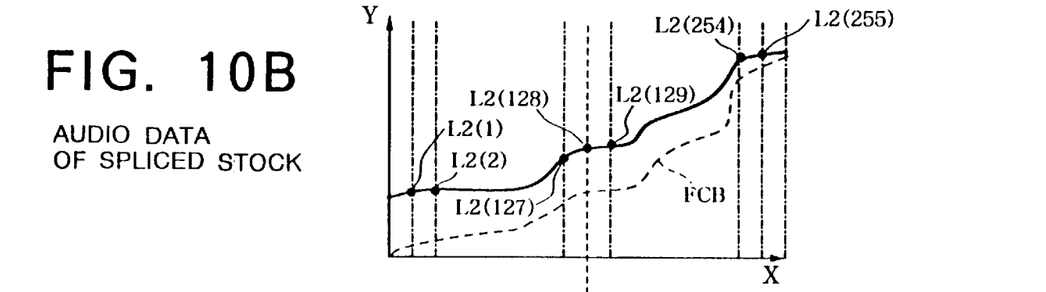
Figure 10C:
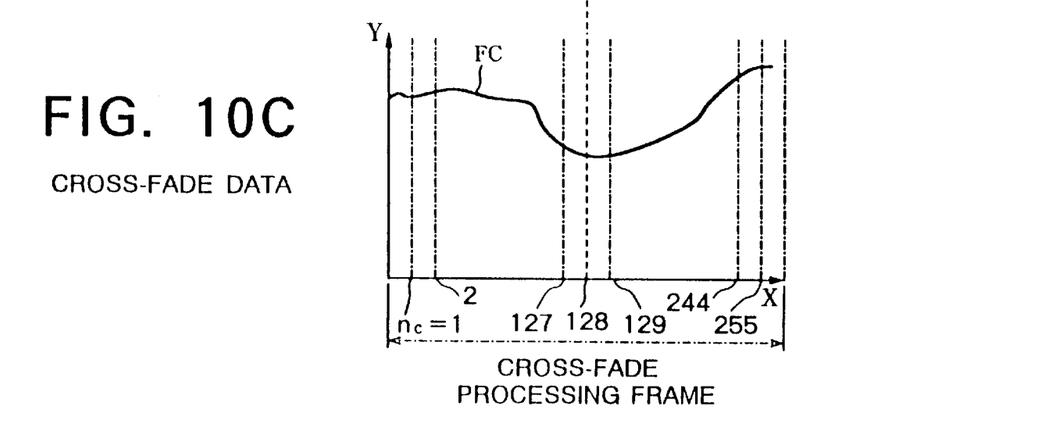

FIGS. 10A to 10C are views for explaining the cross-fade processing.

FIG. 10A shows the audio data of the underlying stock recorded in the disk unit 20; and FIG. 10B shows the audio data of the spliced stock recorded in the disk unit 20 in advance.

Such cross-fade processing is carried out so as to add the processing data to the starting and end points of the recording of the stock indicated by "*" in FIGS. 9A to 9C.

In this cross-fade processing, a predetermined amount of audio data from the starting position of a frame of the underlying stock shown in FIG. 10A, for example, 256 samples of audio data, is extracted every other sample from the start of the frame and written into the buffer RAN 165 of the disk control unit 16. Further, a predetermined amount of the audio data equal to the underlying stock from the starting position of a frame of the spliced stock shown in FIG. 10B, for example 256 samples of the audio data taken every other sample from the start of frame, is written into the buffer RAM 165.

Next, the processings shown in the following equations (1) to (3) are carried out by the CPU 162a of the disk control CPU block 162 by using the audio data written in the buffer RAM 165, whereby the audio data for the switching for replacing the audio data of the underlying stock with the audio data of the spliced stock is generated.

$$FCA = (256 - n_o) \times L1(n_o)/256 \quad (1)$$

$$FCB = n \times L2(n_o)/256 \quad (2)$$

$$FC = FCA + FCB \quad (3)$$

Here, the variable $n_o$ is an integer from 1 to 256. Further, $L1(n_o)$ is the value of the audio data of the underlying stock at the position $n_o$, while $L2(n_o)$ is the value of the audio data of the spliced stock at the position $n_o$.

In this way, the value of the cross-fade data FCA calculated from the audio data of the underlying stock (indicated by a broken line of FIG. 10A) is attenuated along with the elapse of time. Further, the cross-fade data FCB calculated from the audio data of the spliced stock (indicated by the broken line of FIG. 10B) is increased from substantially "0" level to the value of the data of the spliced stock along with the elapse of time.

By adding the data FCA based on the underlying stock and the data FCB based on the spliced stock, the switching use audio data FC enabling switching so as to connect the underlying stock and spliced stock as shown in FIG. 10C is generated.

Next, an explanation will be made of the fade-out/fade-in processing.

Figure 11A:
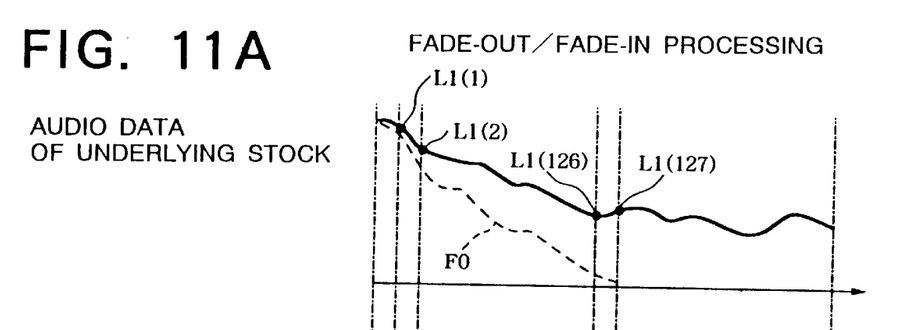
FIGS. 11A to 11C are views for explaining a fade-out/fade-in processing.
Figure 11B:
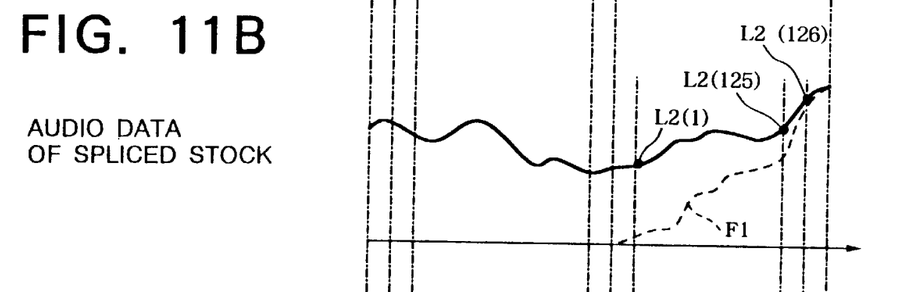

FIG. 11A shows the audio data of a frame of the underlying stock recorded in the disk unit 20, while FIG. 11B shows the audio data of a frame of the spliced stock recorded in the disk unit 20 in advance.

Such fade-out/fade-in processing is carried out so as to add processing data to the starting and end points of the recording of the stock indicated by "*" in FIGS. 9A to 9C.

In this fade-out/fade-in processing, a predetermined amount of the audio data from the starting position of the first frame of the underlying stock shown in FIG. 11A, for example, 27 samples of audio data from the start of frame, is extracted at every other sample and written into the buffer RAM 165 of the disk control unit 16. Further, a predetermined amount of the audio data from the position after an elapse of a predetermined time from the starting position of the initial frame of the spliced stock shown in FIG. 11B, for example, 126 samples of audio data, is extracted from every other sample from the audio data of the position corresponding to the 128th sample of the underlying stock from the frame starting position and written into the buffer RAM 165 of the disk control unit 16.

Next, the processings shown in the following equations (4) and (5) are carried out by the CPU 162a of the disk control CPU block 162 by using the audio data written in the buffer RAM 165 so that fade-out data FO and fade-in data FI are generated.

$$FO=(128-n_o) \times L1(n_o)/128 \quad (4)$$

$$FI=n_i \times L2(n_i)/127 \quad (5)$$

Here, the variable $n_o$ is an integer from 1 to 127, while the variable $n_i$ is an integer from 1 to 126. Further, $n_i=1$ corresponds to the position of $n_o=128$ next to $n_o=127$. Further, the variable $L1(n_o)$ is the value of the audio data of the underlying stock at the position $n_o$, while $L2(n_i)$ is the value of the audio data of the spliced stock at the position $(n_i)$.

In this way, the value of the fade-out data FO (indicated by the broken line of FIG. 11A) of the audio data of the underlying stock is attenuated along with the elapse of time, while the value of the fade-in data FI of the audio data of the spliced stock (indicated by the broken line of FIG. 11B) is returned to the state where the value is not attenuated along with the elapse of time.

Figure 11C:
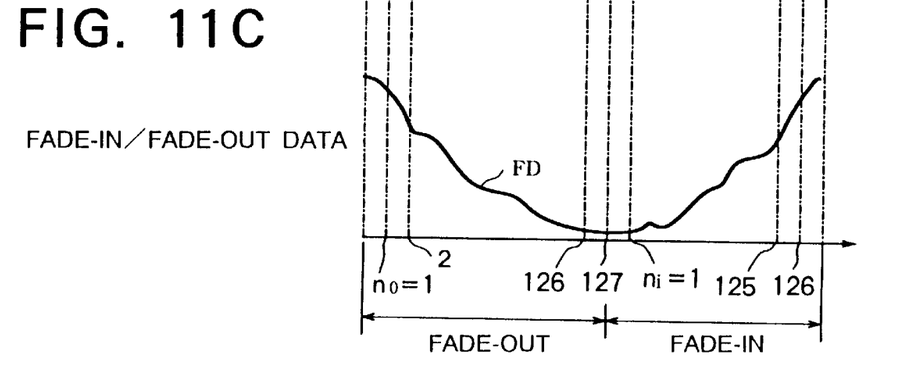

By connecting this fade-out data FO of the underlying stock and the fade-in data FI of the spliced stock, as shown in FIG. 11C, switching use audio data FD enabling continuous switching from the audio data of the underlying stock to the audio data of the spliced stock is generated.

Note that the extraction of the audio data in the cross-fade processing and the fade-out/fade-in processing and the number of samples are not limited to those of the above embodiment. For example, while illustration was given of the case where the samples of the audio data were extracted at every other sample, it is also possible to continuously extract them. Further, it is also possible to complete the cross-fade processing and fade-out/fade-in processing in a period of a half of one frame or a period of one frame. Further, the time of fade-out and fade-in can be made changed by changing the numbers of samples at the fade-out side and the fade-in side.

As explained above, according to the editing apparatus 10, the data recorded in the disk unit 20 can be recorded on the magnetic tape by using the VTR 50 without using a streamer or the like, so the system cost can be lowered.

Namely, a back-up function etc. can be given to the editing apparatus 10 by an inexpensive hardware configuration.

Further, in the disk control unit 16, by performing the cross-fade processing and the fade-out/fade-in processing, when returning the data saved on the magnetic tape to the disk unit 20, the noise produced at the splices of the recorded stock can be effectively suppressed.

According to the above data transfer and recording apparatus and the method of same, the transfer and recording of the audio data and video data can be carried out between a disk-shaped recording medium such as a hard disk and a magnetic tape without using a streamer or the like. For this reason, the system cost can be lowered.

Further, according to the above data transfer and recording apparatus and the method of same, by performing the cross-fade processing and fade-out/fade-in processing, when returning the data saved on the magnetic tape to the disk-shaped recording medium, the noise produced at the splices of the recorded stock can be effectively suppressed.

While the invention has been described by reference to specific embodiments chosen for purposes of illustration, it should be apparent that numerous modifications could be made thereto by those skilled in the art without departing from the basic concept and scope of the invention.

What is claimed is:

1. A data transfer and recording apparatus for transferring four channels of digital audio data from a disk-shaped recording medium to a magnetic tape containing a two-channel audio sector, comprising:

a memory for storing said four channels of digital audio data supplied by said disk-shaped recording medium, for reading out the stored audio data to an interleave circuit, and for maintaining control over the stored read out audio data of said memory;

an interleaving circuit for interleaving said four channels of audio data read from said memory into two channels, each containing two streams of interleaved audio data;

a mixer for mixing said interleaved audio data with video data supplied by said disk-shaped recording medium; and a recording controller for recording one channel of said interleaved audio data on a first region of said audio sector, recording the other channel of said interleaved audio data on a second region of said audio sector continuing from said first region and recording said video data on a video sector.

2. A data transfer and recording apparatus according to claim 1, wherein, said recording controller repeatedly records said reproduced video data supplied from said disk-like recording medium on regions of a video sector corresponding to said first region and said second region of said audio sector.

3. A data transfer and recording apparatus according to claim 1, wherein said recording controller records said reproduced video data supplied from said disk-like recording medium on a region of a video sector corresponding to said first region of said audio sector and records video data received next from said disk-like recording medium on a region of the video sector corresponding to the second region of said audio sector.

4. A data transfer and recording apparatus according to claim 1, wherein said recording controller provides a recording section on which a sampling frequency of said first audio data is recorded between said first audio data and said second audio data on said recording section of said magnetic tape.

5. A data transfer and recording apparatus according to claim 1, further comprising, a deinterleaving circuit for deinterleaving two channels of interleaved audio data stored on said magnetic tape, restoring the deinterleaved channels into four channels of audio data and transferring said deinterleaved audio data to said disk-shaped recording medium.

6. A data transfer and recording apparatus according to claim 5, further comprising, an editor for editing said audio and video data stored on said magnetic tape, a controller for suppressing noise produced at splices made during editing of said interleaved audio data stored on said magnetic tape by transferring said deinterleaved audio data to and recording it on said disk-shaped recording medium, reading said recorded deinterleaved audio data and original unedited audio data stored on the disc-shaped recording medium to a memory, performing cross-fade processing or fade-out/fade-in processing at the starting and end points of said deinterleaved audio data and said original unedited audio data, and writing the processed audio data on to said disk-shaped recording medium.

7. A data transfer and recording apparatus according to claim 1, wherein said disk-shaped recording medium is a hard disk.

8. A data transferring and recording method for transferring and recording four channels of digital audio data from a disk-shaped recording medium to a magnetic tape containing a two-channel audio sector, comprising the steps of:

storing said four channels of audio data supplied by said disk-shaped recording medium, reading out the stored audio data to an interleave circuit, and maintaining control over the stored read out audio data of said memory, interleaving said four channels of read out audio data into two channels, each containing two streams of interleaved audio data;

mixing said interleaved audio data with video data supplied by said disk-shaped recording medium; and recording one channel of said interleaved audio data on a first region of said audio sector, recording the other channel of said audio data on a second region of said audio sector continuing from said first region and recording said video data on a video sector.

9. A data transferring and recording method according to claim 8, wherein said video data supplied by said disk-shaped recording medium is repeatedly recorded in regions of a video sector corresponding to a first region of said audio sector and a second region of said audio sector.

10. A data transferring and recording method according to claim 8, wherein said video data supplied by said disk-shaped recording medium is recorded in a region of the video sector corresponding to a first region of said audio sector and video data supplied next by said disk-like recording medium is recorded in a region of the video sector corresponding to a second region of said audio sector.

* * * * *